(12) United States Patent
Larsson et al.

(10) Patent No.: US 11,833,980 B2
(45) Date of Patent: Dec. 5, 2023

(54) TRUCK BOX

(71) Applicant: Metso Outotec Finland Oy, Tampere (FI)

(72) Inventors: Fredrik Larsson, Malmö (SE); Henrik Persson, Trelleborg (SE); Niclas Hällevall, Lund (SE); Michael Gyberg, Malmö (SE)

(73) Assignee: Metso Outotec Finland Oy, Tampere (FI)

( * ) Notice: Subject to any disclaimer, the term of this patent is extended or adjusted under 35 U.S.C. 154(b) by 656 days.

(21) Appl. No.: 16/768,158

(22) PCT Filed: Nov. 30, 2018

(86) PCT No.: PCT/EP2018/083198
§ 371 (c)(1),
(2) Date: May 29, 2020

(87) PCT Pub. No.: WO2019/106174
PCT Pub. Date: Jun. 6, 2019

(65) Prior Publication Data
US 2021/0370850 A1    Dec. 2, 2021

(30) Foreign Application Priority Data
Dec. 1, 2017 (SE) .................................. 1751484-5

(51) Int. Cl.
*B60P 1/28* (2006.01)
*B60R 13/01* (2006.01)

(52) U.S. Cl.
CPC .............. *B60R 13/01* (2013.01); *B60P 1/286* (2013.01)

(58) Field of Classification Search
CPC .. B60P 1/286; B60P 1/28; B60P 1/283; B60R 13/01
(Continued)

(56) References Cited

U.S. PATENT DOCUMENTS 4,029,354 A    6/1977   Valeri
5,803,531 A    9/1998   Nielsen
(Continued)

FOREIGN PATENT DOCUMENTS

AU    2003235040 B2    8/2003
AU    2012203704 B2    6/2012
(Continued)

OTHER PUBLICATIONS

Office Action and Search Report for corresponding Chilean Patent Application No. 202001441, dated Apr. 8, 2022.
(Continued)

*Primary Examiner* — Stephen T Gordon
(74) *Attorney, Agent, or Firm* — ANDRUS INTELLECTUAL PROPERTY LAW, LLP

(57) ABSTRACT

The disclosure relates to a haul truck body arranged to have a specific nominal payload capacity. The haul truck body includes an outer load carrying structure which has a front wall, two opposing side walls, and a bottom. The haul truck body further includes an inner load carrying structure arranged at inner surfaces of the outer load carrying structure, wherein neither the outer load carrying structure nor the inner load carrying structure alone is arranged to carry the specific nominal payload.

14 Claims, 2 Drawing Sheets

(58) Field of Classification Search
USPC .................. 298/7, 17 R, 22 R, 22 P
See application file for complete search history.

(56) References Cited

U.S. PATENT DOCUMENTS

| | | | |
|---|---|---|---|
| 6,076,693 | A | 6/2000 | Reiter et al. |
| 6,280,551 | B1 | 8/2001 | Hilligoss |
| 6,520,590 | B2 | 2/2003 | Azocar |
| 7,025,407 | B2 | 4/2006 | Medel |
| 8,141,928 | B2 | 3/2012 | Zamorano Jones |
| 8,714,658 | B2 | 5/2014 | Sepulveda |
| 9,102,260 | B2 | 8/2015 | Sepulveda |
| 2005/0093338 | A1 | 5/2005 | Medel |
| 2007/0069569 | A1* | 3/2007 | D'Amico .......... B60P 1/286 298/7 |
| 2012/0205962 | A1* | 8/2012 | Hagenbuch ........ B60P 1/286 298/17 R |
| 2014/0015279 | A1 | 1/2014 | Silva et al. |
| 2014/0252801 | A1 | 9/2014 | Iettinger et al. |
| 2014/0312642 | A1 | 10/2014 | Amstutz et al. |

FOREIGN PATENT DOCUMENTS

| | | |
|---|---|---|
| AU | 2012327208 B2 | 12/2012 |
| CA | 2086058 A1 | 12/1992 |
| CL | 1760-2007 | 3/2008 |
| CL | 1670-2014 | 12/2014 |
| CN | 202413974 U | 5/2012 |
| CN | 104136272 A | 5/2014 |
| EP | 1473189 B1 | 11/2003 |
| EP | 2607160 A1 | 12/2011 |
| EP | 2607161 | 6/2013 |
| GB | 1512511 A | 6/1978 |
| GB | 2109303 A | 10/1981 |
| GB | 2183615 A | 12/1986 |
| WO | 2007105038 A2 | 10/2006 |

OTHER PUBLICATIONS

International Search Report and Written Opinion for International Application No. PCT/EP2018/083198 dated Feb. 20, 2019.
International Preliminary Report on Patentability for International Application No. PCT/EP2018/083198 dated Nov. 11, 2019.
Notification of Opposition for corresponding Chilean Patent Application No. 2020-001441 dated Mar. 12, 2021.
Opposition Brief for corresponding Chilean Patent Application No. 2020-001441 dated Jan. 6, 2021.
Office action for corresponding Chinese Patent Application No. 201880076699.6 dated Dec. 1, 2021.

\* cited by examiner

TRUCK BOX

CROSS-REFERENCE TO RELATED APPLICATIONS

This application is the U.S. national stage application of International Application PCT/EP2018/083198, filed Nov. 30, 2018, which international application was published on Jun. 6, 2019, as International Publication WO 2019/106174 A1 in the English language. The International Application claims priority of Swedish Patent Application No. 1751484-5 filed Dec. 1, 2017.

TECHNICAL FIELD

The present invention relates to a haul truck body and to a truck comprising a haul truck body.

BACKGROUND

Haul truck bodies are used on trucks, for example in the mining industry, for transporting mined material from one location to another. These are often designed to maximize load capacity such that the highest possible amount of material can be transported by the truck. Considering the weight of the mined material, the haul truck body is required to provide a certain mechanical strength in order to withstand the load. A steel body with a thickness of at least 16-30 mm is typically used for this purpose. Although providing the mechanical strength for holding a high amount of material, the steel in itself presents a considerable weight which is limiting to the total amount of weight a truck is capable of carrying.

At the same time, loading and unloading of the material can cause wear of the haul truck body, both in terms of impact wear as the material is loaded, and in terms of wear due to friction generated as material is unloaded, generally by tipping the haul truck body. To avoid this type of wear on the steel body, wear resistant linings are used. Although possibly proving to be efficient for avoiding wear, these linings further add on the total weight of the haul truck body such that the total load capacity of a truck is reduced.

SUMMARY

An object of the invention is to overcome, or at least lessen the above mentioned problems. A particular object is to provide a haul truck body for e.g. a mining truck with improved load capacity. To better address this concern, in a first aspect of the invention there is provided a haul truck body having a specific nominal payload capacity. The haul truck body comprises an outer load carrying structure having a front wall, two opposing side walls, and a bottom. It further comprises an inner load carrying structure arranged at inner surfaces of the outer load carrying structure and neither the outer load carrying structure nor the inner load carrying structure alone is arranged to carry the specific nominal payload. Instead of dimensioning the outer load carrying structure to be able to carry the entire specific nominal payload, the present invention is based upon the realization that it is possible to take advantage of the fact that an inner load carrying structure is applied. Typically and previously, this structure had as sole purpose to provide a wear resistant lining surface, e.g. for impact load during loading and/or as wear resistant lining against abrasive wear from the payload. In the present invention, however, it has surprisingly been found that it is possible to reduce the structural strength of the outer load carrying structure since the inner load carrying structure, even if provided in the form of e.g. rubber lining elements, will contribute to the structural strength carrying the nominal payload. Thus, the structural strength, and thereby the weight thereof, of the outer load carrying structure can be reduced without sacrificing nominal payload capacity. This means that a given nominal payload capacity can be achieved with a reduced vehicle weight, thus enabling lower fuel consumption. Or alternatively, allowing increased nominal payload capacity with maintained vehicle weight. Tests and calculations have shown that haul truck box weight may be reduced with between 20-30%. This in turn means that the nominal payload capacity can be increased with up to at least 5-8%.

In accordance with an embodiment of the first aspect of the invention, the outer load carrying structure comprises a steel structure. Steel has a good ratio between cost, strength and wear resistance.

In accordance with an embodiment of the first aspect of the invention, the inner load carrying structure comprises a lining surface for said haul truck body. A lining can provide both the impact strength desirable e.g. during loading of the truck and the wear resistance which is required to withstand abrasive wear during e.g. unloading of the payload.

In accordance with an embodiment of the first aspect of the invention, the inner load carrying structure is made of a material having a lower density than steel. A lower density normally means a softer material suitable to carry impact load. It also generally means a lighter material, depending, of course, on the amount used.

In accordance with an embodiment of the first aspect of the invention, the material of the inner load carrying structure is a plastic material, such as a polymer. Polymers can provide a good combination of surface wear resistance and impact properties.

In accordance with an embodiment of the first aspect of the invention, the polymer is rubber. Rubber has excellent lining properties for the specific requirements in haul trucks.

In accordance with an embodiment of the first aspect of the invention, the polymer is a polyurethane (PU). PU is a good alternative to rubber.

In accordance with an embodiment of the first aspect of the invention, the thickness of said outer load carrying structure is less than 15 mm. Whereas prior art solutions typically has a wall thicknesses of approximately 20 mm, it has been found that a thickness of less than 15 mm is sufficient to carry a corresponding payload.

In accordance with an embodiment of the first aspect of the invention, the thickness of said inner load carrying structure is at least 30 mm. It has been established that using an inner load carrying structure having a thickness of at least 30 mm, may contribute to the overall payload capacity to such extent that the structural strength of the outer load carrying structure can be reduced without sacrificing total payload capacity.

In accordance with an embodiment of the first aspect of the invention, a thickness ratio of said inner load carrying structure to said outer load carrying structure is at least 3:1.

In accordance with an embodiment of the first aspect of the invention, a thickness ratio of said inner load carrying structure to said outer load carrying structure is in the range of 25:1 to 3:1.

In accordance with an embodiment of the first aspect of the invention, a thickness ratio of said inner load carrying structure to said outer load carrying structure is in the range of 13:1 to 4:1.

In accordance with an embodiment of the first aspect of the invention, a thickness ratio of said inner load carrying structure to said outer load carrying structure is in the range of 10:1 to 6:1.

In accordance with an embodiment of the first aspect of the invention, the inner load carrying structure comprises a plurality of inner load carrying structure elements. By providing the inner load carrying structure in the form of a plurality of separate elements, it is in a simple manner possible to provide different properties at different parts of the haul truck body. They can also be replaced individually when worn out or broken.

In accordance with an embodiment of the first aspect of the invention, the thickness varies between different inner load carrying structure elements. Different parts of the haul truck body will have different requirements as to wear and impact strength properties. For example, elements arranged at the bottom will normally have to handle the largest impact loads during loading whereas elements near the upper perimeter of the side walls do not have to carry any, or at least much less, impact loads at all.

In accordance with a second aspect of the invention, there is provided a method of constructing a haul truck body, comprising the steps of:

designing an outer load carrying structure having a designed thickness to accommodate a desired payload;

determining an additional amount of strength provided by an inner load carrying structure which can be arranged at inner surfaces of the outer load carrying structure;

determining a reduced thickness for the outer load carrying structure based on the additional strength provided by the inner load carrying structure, wherein the reduced thickness is less than the designed thickness; and manufacturing the haul truck body having the reduced thickness.

The method according to the second aspect of the invention achieves the same advantages and benefits as described previously in relation to the first aspect of the invention. The different embodiments described in relation to the first aspect of the invention are also applicable to the method according to the second aspect of the invention with the same advantages and benefits.

Generally, all terms used in the claims are to be interpreted according to their ordinary meaning in the technical field, unless explicitly defined otherwise herein. All references to "a/an/the [element, device, component, means, step, etc.]" are to be interpreted openly as referring to at least one instance of said element, device, component, means etc., unless explicitly stated otherwise.

As used herein, the term "comprising" and variations of that term are not intended to exclude other additives, components, integers or steps.

BRIEF DESCRIPTION OF THE DRAWINGS

The invention will be described in more detail and with reference to the appended drawings in which.

DESCRIPTION OF EMBODIMENTS

Figure 1:
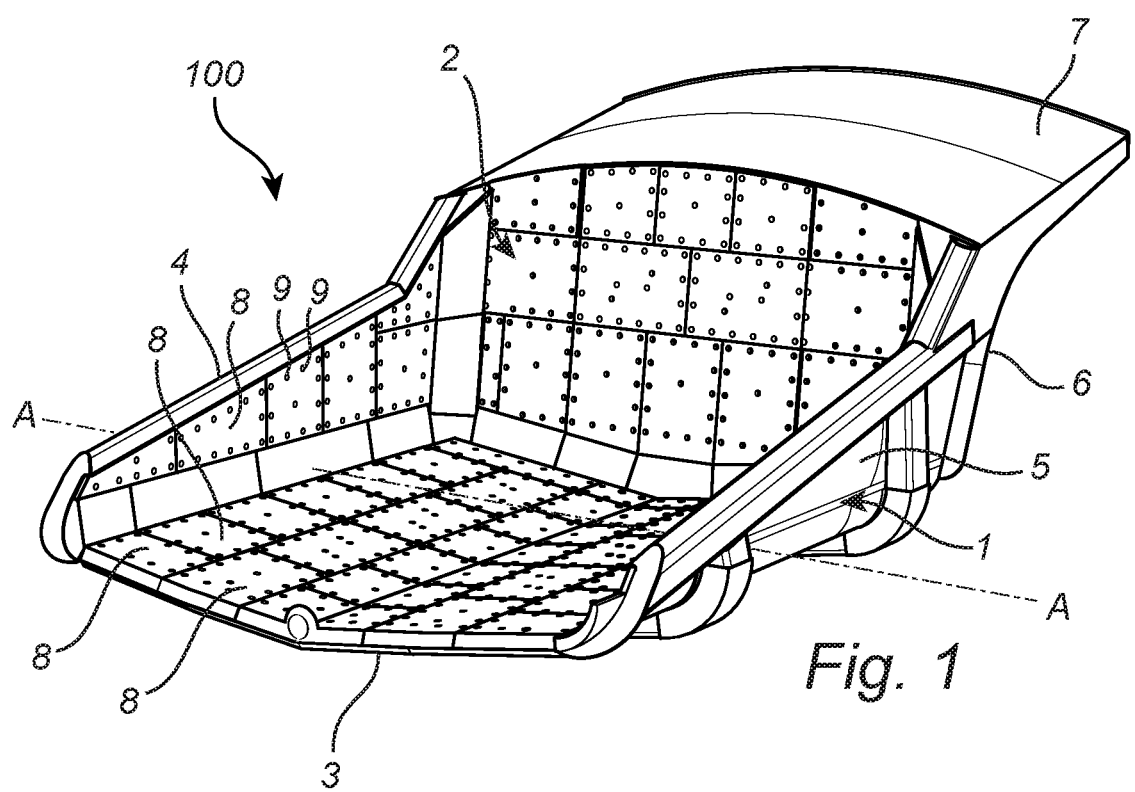
FIG. 1 shows a perspective view of a haul truck according to one embodiment of the disclosed invention.

The present invention will now be described more fully hereinafter with reference to the accompanying drawings, in which exemplifying embodiments of the invention are shown. The present invention may, however, be embodied in many different forms and should not be construed as limited to the embodiments set forth herein; rather, these embodiments are provided for thoroughness and completeness, and to fully convey the scope of the invention to the skilled addressee. Like reference characters refer to like elements throughout.

FIG. 1 shows a perspective view of a haul truck body 100 according to the invention. The haul truck body 100 comprises an outer load carrying structure 1 having a bottom 3, opposing side walls 4, 5, a front wall 6 and a canopy 7. Generally, the outer load carrying structure 1 comprises a steel structure. Arranged on an inner surface of the outer load carrying structure 1 is an inner load carrying structure 2, here arranged in the form of a plurality of lining elements 8 attached to the inner surface of the outer load carrying structure 1. More particularly, the inner load carrying structure 2 is arranged at the inner surfaces of the bottom 3, side walls 4, 5 and front wall 6 of the outer load carrying surface. The lining elements 8 can be made from one of a plurality of different materials, e.g. rubber, polyurethane, other polymers etc. Combinations of materials are also conceivable and reinforcements from e.g. steel or other metals can be arranged on or within the lining elements 8.

The inner load carrying structure 2 can be arranged at the inner surface of the outer load carrying structure 1 by any means suitable for the purpose. In the embodiment of FIG. 1, removable fastening elements 9 are used to attach the lining elements to the outer load carrying structure 1. Using such removable fastening elements provides an advantage when it comes to replacement of parts of the inner load carrying structure 2 which have been worn out, such as for example lining elements located at the bottom 3 of the haul truck body 100, generally subjected to higher wear from e.g. impact during loading and abrasive wear during transportation and unloading of material.

The inner load carrying structure 2 may furthermore be made of a material having a lower density than steel, such as for example a plastic material. In an embodiment of the invention, the plastic material is a polymer. In a preferred embodiment, the polymer is rubber. The skilled person understands, however, that other polymers, such as for example polyurethane, can be used for the inner load carrying structure 2.

Figure 2:
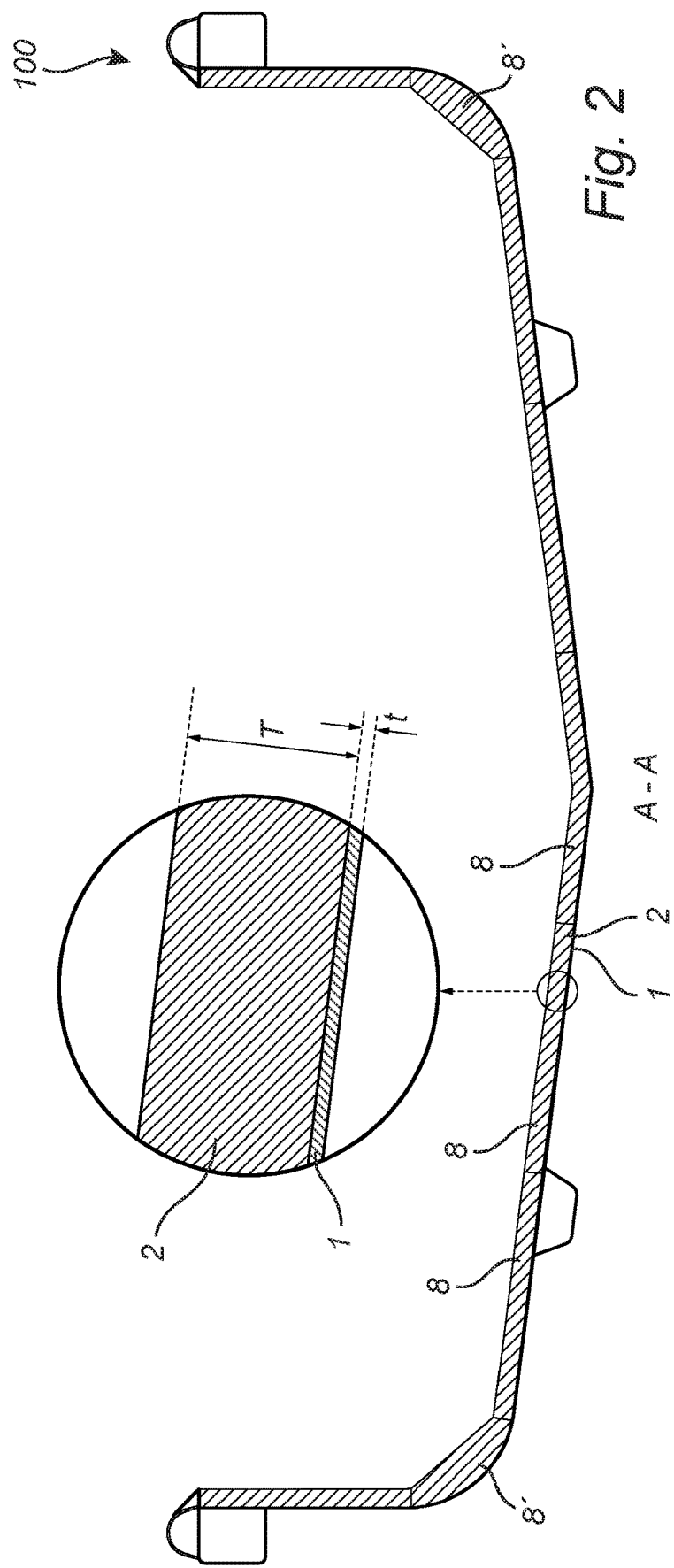
FIG. 2 shows a schematic cross-sectional view of a truck haul body according to one embodiment of the disclosed invention

FIG. 2 is a cross-sectional view along line A-A indicated in FIG. 1. As can be seen, the lining elements 8 are arranged at an inner surface of the outer load carrying structure 1. It has surprisingly been found that it is possible to take into consideration a structural strength component from the inner load carrying structure 2 when dimensioning the haul truck body 100 for a given nominal payload capacity. Thus, in contrast to prior art solutions, where the outer load carrying structure is dimensioned to carry the given payload capacity on its own, the current invention is based on the realization that the inner load carrying structure 2, e.g. a layer of lining elements 8 will contribute to the payload capacity in a substantial manner. Thereby, in the case where the outer load carrying structure 1 is intended to be used with such inner load carrying structure 2, e.g. a lining layer, the outer load carrying structure 1 can be dimensioned accordingly, i.e. as such having a reduced nominal load capacity. This has a major advantage in that the weight of the haul truck body can be substantially reduced, thereby increasing the payload capacity, i.e. the amount of material that the truck can transport. Calculations have shown that the weight of the haul truck body 100 can be reduced by 20-30% without affecting the structural integrity of the same. Therefore, a higher load can be carried by the haul truck body, allowing for an increase in payload capacity of at least 5-8% with maintained total truck weight.

The outer load carrying structure 1 has a thickness t, and the inner load carrying structure 2 has a thickness T. More particularly, for the embodiment shown in FIG. 2, comprising a plurality of inner load carrying structure elements 8, the thickness T varies between the different elements 8. Generally, the thickness t of the outer load carrying structure 1 is less than 15 mm. As an example only, the thickness t can be as low as approximately 8 mm. This represents a reduction by more than 50% of the load carrying structures currently used, which typically have a minimum thickness of 16 mm.

The thickness of the inner load carrying structure is generally at least 30 mm. As can be seen in FIG. 2, the thickness T of the lining elements 8' in the corners is larger than the thickness of other lining elements 8. Generally, and to be taken as examples only, the thickness of the lining elements arranged at the bottom 3 of the outer load carrying structure 1 and in the corners is from 50 to 150 mm, whereas the thickness of the lining elements 8 arranged at the sides 4, 5 and the front wall 6 is between 30 and 130 mm.

The skilled person realizes that a number of modifications of the embodiments described herein are possible without departing from the scope of the invention, which is defined in the appended claims.

The invention claimed is:

1. A haul truck body arranged to have a specific nominal payload capacity, said haul truck body comprising:
   an outer load carrying structure comprising a front wall, two opposing side walls, and a bottom; and
   an inner load carrying structure arranged at inner surfaces of said outer load carrying structure, wherein said inner load carrying structure comprises a lining surface for the haul truck body and a plurality of inner load carrying structure elements and wherein said inner load carrying structure comprises a polymer,
   wherein neither said outer load carrying structure nor said inner load carrying structure alone is arranged to carry said specific nominal payload, further wherein a thickness of the plurality of inner load carrying structure elements varies between the bottom of the haul truck body and the opposing side walls of the haul truck body.

2. The haul truck body according to claim 1, wherein said outer load carrying structure comprises a steel structure.

3. The haul truck body according to claim 1, wherein said inner load carrying structure is made of a material having a lower density than steel.

4. The haul truck body according to claim 1, wherein said polymer is rubber.

5. The haul truck body according to claim 1, wherein said polymer is a polyurethane.

6. The haul truck body according to claim 1, wherein the thickness of said outer load carrying structure is less than 15 mm.

7. The haul truck body according to claim 1, wherein the thickness of said inner load carrying structure varies and is at least 30 mm.

8. The haul truck body according to claim 1, wherein a thickness ratio of said inner load carrying structure to said outer load carrying structure is at least 3:1.

9. The haul truck body according to claim 1, wherein a thickness ratio of said inner load carrying structure to said outer load carrying structure is in the range of 25:1 to 3:1.

10. The haul truck body according to claim 1, wherein a thickness ratio of said inner load carrying structure to said outer load carrying structure is in the range of 13:1 to 4:1.

11. The haul truck body according to claim 1, wherein a thickness ratio of said inner load carrying structure to said outer load carrying structure is in the range of 10:1 to 6:1.

12. The haul truck body according to claim 1, wherein the thickness varies between different ones of the inner load carrying structure elements.

13. A method of constructing a haul truck body, comprising:
   designing an outer load carrying structure having a designed thickness to accommodate a desired payload;
   determining an additional amount of strength provided by an inner load carrying structure which can be arranged at inner surfaces of said outer load carrying structure, wherein said inner load carrying structure comprises a lining surface for the haul truck body and a plurality of inner load carrying structure elements, wherein the thickness of the plurality of inner load carrying structure elements varies between a bottom of the haul truck body and sides of the haul truck body and wherein said inner load carrying structure comprises a polymer;
   determining a reduced thickness for the outer load carrying structure based on the additional strength provided by the inner load carrying structure, wherein the reduced thickness is less than the designed thickness; and
   manufacturing the haul truck body having the reduced thickness.

14. The method according to claim 13, wherein the polymer is a rubber or a polyurethane.

* * * * *